Aug. 16, 1927.

E. P. KINNE 1,639,300

COUPLER MECHANISM

Filed Sept. 27, 1926

Witness:
G. Burkhardt

Inventor:
Edmund P Kinne,
By Wilkinson, Huxley, Byron & Knight
Attys.

Aug. 16, 1927.

E. P. KINNE 1,639,300

COUPLER MECHANISM

Filed Sept. 27, 1926   6 Sheets-Sheet 6

Witness:
R. Burkhardt

Inventor:
Edmund P. Kinne,
By Wilkinson, Huxley, Byron & Knight
Attys.

Patented Aug. 16, 1927.

1,639,300

UNITED STATES PATENT OFFICE.

EDMUND P. KINNE, OF ALLIANCE, OHIO, ASSIGNOR TO AMERICAN STEEL FOUNDRIES, OF CHICAGO, ILLINOIS, A CORPORATION OF NEW JERSEY.

COUPLER MECHANISM.

Application filed September 27, 1926. Serial No. 137,882.

This invention relates to coupler mechanism.

One object of the invention is to improve the operation of couplers and more particularly the standard A. R. A. type D coupler in a manner whereby the coupler can always be operated positively and easily to either lock set or full knuckle throw positions through the medium of the uncoupling rod.

Another object is to provide simple, reliable and efficient coupler operating mechanism having cooperating parts whereby a maximum operating force may be transmitted to the lock for facilitating the operation of the coupler.

Another object is to provide bottom lift mechanism for the standard A. R. A. type D coupler whereby the operating force heretofore transmitted to the lock of said standard coupler is increased.

Another object is to provide an improved bottom lift coupler which not only will properly function as a bottom lift coupler, but is of such a character as to make it practical to substitute for the top lift coupler, one coupler therefore being capable of taking the place of the two now required.

Another object of the invention is to provide coupler mechanism, the various parts of which cooperate in an improved manner to accomplish the best results under service conditions.

These and other objects are accomplished by means of the arrangement disclosed on the accompanying sheets of drawings, in which—

The various novel features of the invention will be apparent from the following description and drawings and will be particularly pointed out in the appended claims.

Before referring specifically to the drawings illustrating my invention, it may be well to mention the fact that the standard A. R. A. type D coupler is rather difficult to operate; that is to say, to lift the lock from lock position to lock set position and from lock set position to full knuckle throw position, because of excessive frictional engagement between the front of the lock and the associated guide wall thereof and also because of disadvantageous leverages exerted through the lifting mechanism for the lock.

Referring to the figures of the drawings, it will be noted that my invention is illustrated in connection with the standard A. R. A. type D coupler having a head 30 to which a knuckle 31 is pivoted by a pin 32. The coupler is provided with the usual lock 33 having a depending leg 34 in the lower end of which the usual diagonally arranged slot 35 is provided. The regular pivotally mounted knuckle opener 36 is provided for transmitting a knuckle opening movement from the lock 33 to the knuckle 31.

Figure 1:
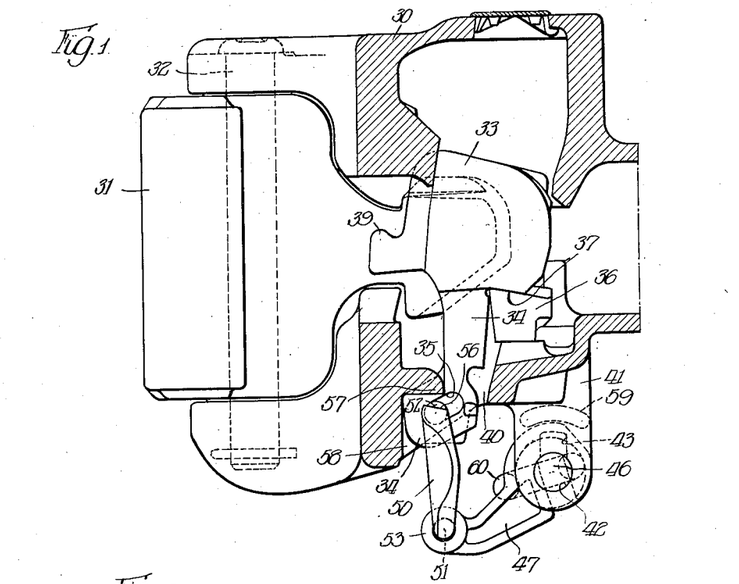
Figure 1 is a fragmentary, vertical sectional view of a standard A. R. A. type D bottom lift type of coupler embodying my invention, the lock being shown in locking position.
Figure 2:
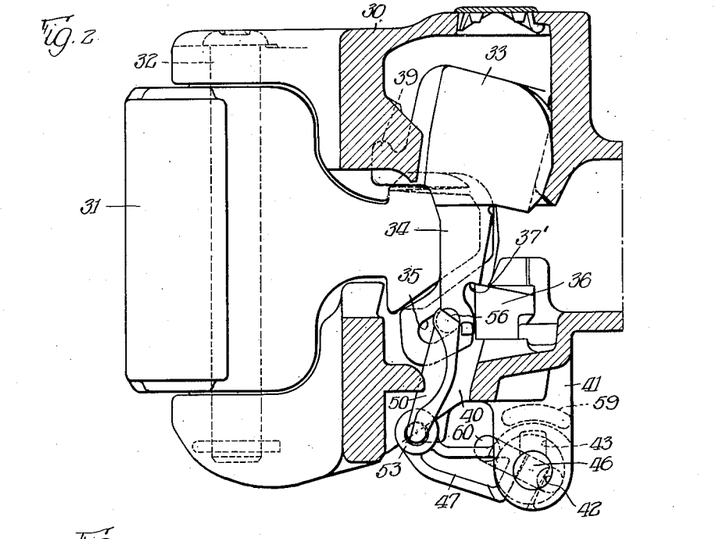
Figure 2 is a similar vertical sectional view of said coupler showing the lock in lock set position.
Figure 3:
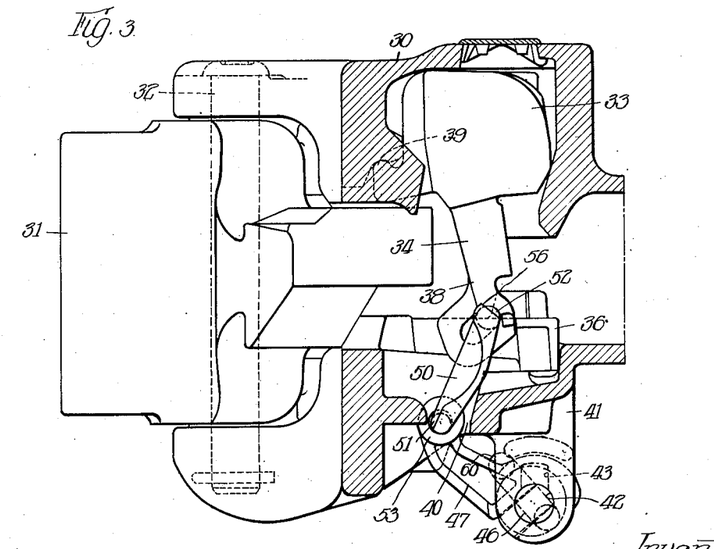
Figure 3 is a similar vertical sectional view of the same coupler showing the coupler in full knuckle throw position.
Figure 4:
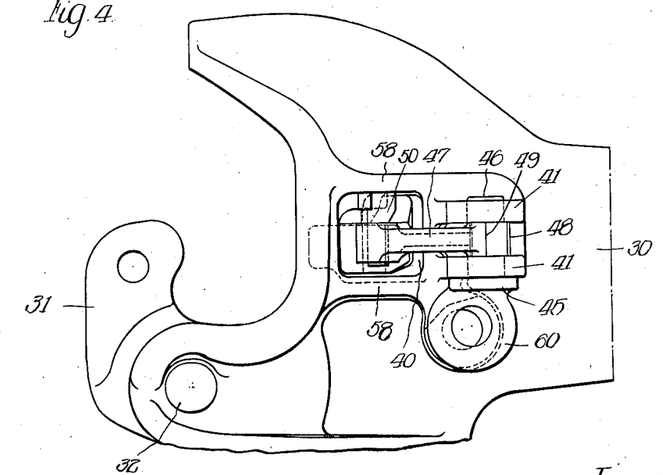
Figure 4 is a bottom plan view of the same coupler.
Figure 5:
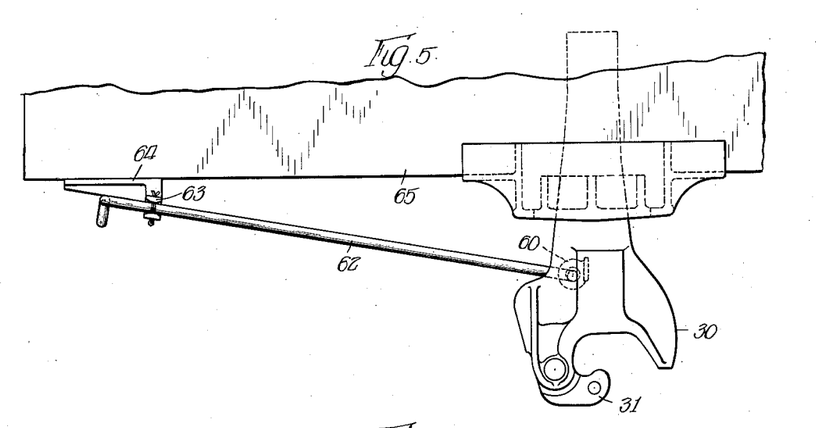
Figure 5 is a top plan view of the same coupler showing the operating rod and its connection to the coupler operating mechanism.
Figure 6:
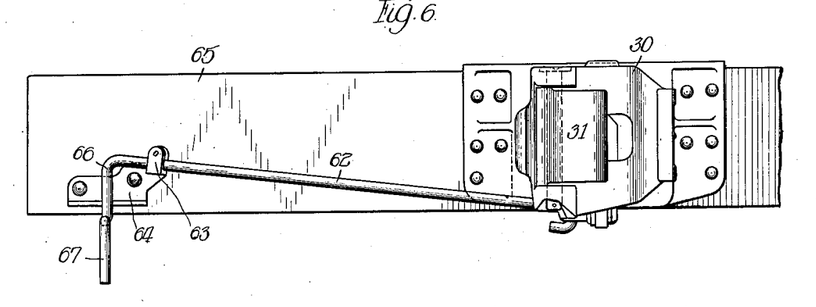
Figure 6 is a front elevation of said coupler and its operating rod.

As shown in Figure 1 the lock 33 is in locking position, that is to say, the knuckle 31 is held in its closed position to form a firm coupling connection with a mating coupler. In such position a rear shoulder 37 of the lock 33 is shown as resting upon the knuckle opener 36. In Figure 2 the lock 33 is shown in lock set position in which a shoulder 37′ on the lock leg 34 rests upon the knuckle opener 36. As is well understood, when the lock is in such a position the knuckle may be opened when a swinging force is applied at the outer end thereof. In Figure 3 the coupler is shown in full knuckle throw position, that is to say, the lock has been pivoted about its toe 39 for throwing the lower end of the lock leg 34 against one arm of the knuckle opener 36 which transmits an opening movement to the knuckle 31. The parts above described are all old in the standard coupler referred to.

Figure 8:
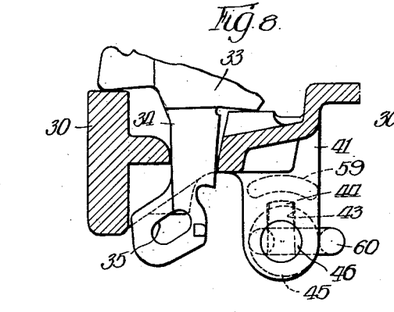
Figure 8 is a fragmentary, vertical sectional view taken through the coupler and showing the method of inserting the rotatable operating member into position between the depending supporting lugs.
Figure 9:
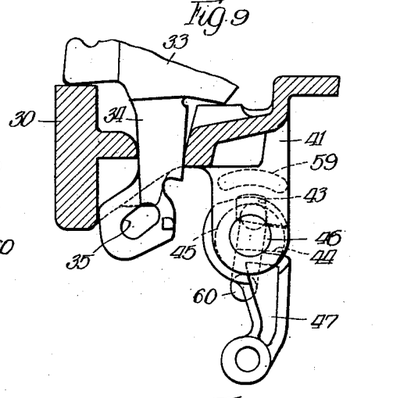
Figure 9 is a similar sectional view showing how the lifter arm is next connected to said rotatable member.
Figure 10:
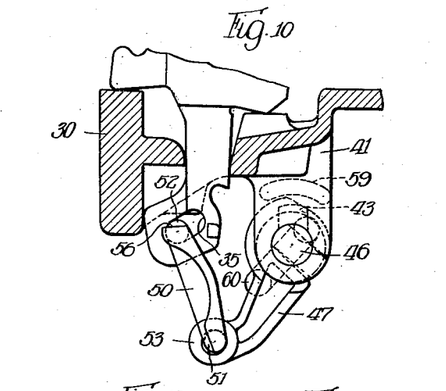
Figure 10 is a similar sectional view showing how the link is then connected to the lifter arm and lock.
Figure 11:
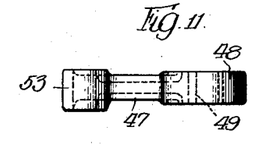
Figures 11 and 12 are top and side elevations of the lifter arm.
Figure 12:
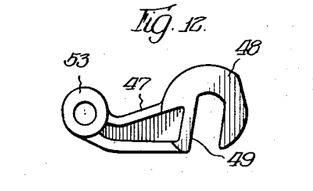
Figure 13:
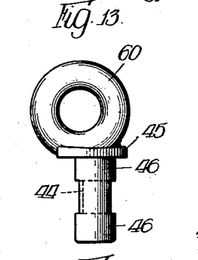
Figures 13 and 14 are two elevational views of the rotatable operating member.
Figure 14:
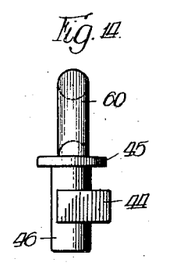
Figure 15:
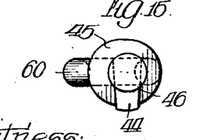
Figure 15 is an end view of the same rotatable operating member.
Figure 16:
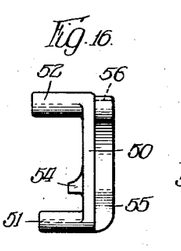
Figure 16 is a front elevational view and Figure 17 a side elevational view of the lifter link connecting the lifter arm and lock.
Figure 17:
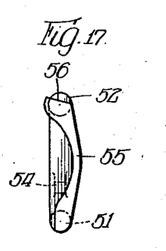

The lock operating or lifting mechanism forming a part of my invention will now be described. Depending from the lower part of the coupler head 30 to the rear of the bottom lock hole 40 are preferably two integrally formed, transversely spaced lugs 41. These lugs are provided with circular bearing portions 42, and in addition thereto one of said lugs has an offset slot 43 registering with one of said bearing portions 42 to permit the passage of a key 44 formed on a rotatable operating member 45 when the latter is inserted into operative position within said lugs 41. This rotatable operating member 45 is provided with trunnion portions 46 (see Figure 13) which are rotatably received by the bearing portions 42. As shown in Figure 8 the rotatable operating member 45 is in a position which it occupies upon being inserted within the lugs 41. The rotatable operating member 45 then may be rotated through an angle of about 90 degrees in a clockwise direction, as shown in Figure 9, to permit connection between it and the lifter arm 47. This lifter arm at its large end 48 is provided with a slot 49 which receives the key 44. After the lifter arm 47 is thus connected to the rotatable operating member 45, said lifter arm and rotatable member may be rotated together a slight amount in a clockwise direction whereupon a link 50 may be connected to the lifter arm 47 and the leg 34 of the lock 33.

Preferably the link is provided with two laterally extending pivotal pins 51 and 52, the former of which is pivotally connected and received within an eye portion 53 of the lifter arm 47, the other pin 52 being pivotally connected to the lower end of the lock leg 34 and being received within the elongated slot 35 thereof. A lateral projection 54 extending parallel to the pins 51 and 52 is provided to overlie the eye portion 53 and is spaced from the pin 51 an amount smaller than the thickness of the material at the bottom of the elongated slot 35 so that the link 50 may be connected to the lifter arm 47 and to the lock in but a single manner. The link is provided with a laterally extending flange 55, preferably curved intermediate its ends so that it may be accommodated within the throat of the bottom lock hole 40 as said link is raised from a position shown in Figure 1 to the positions shown in Figures 2 and 3. The upper end of the lateral flange 55 terminates in a head portion 56 which forms an anti-creep with the rearwardly extending projection 57 on the coupler head, whereby the lock 33 is prevented from accidently moving upwardly from its lock position.

In Figure 1 the link 50 is shown in its normal lowermost operative position, in which position it will be noted that the pin 52 is embraced between the cooperating lateral side walls 58 of the bottom lock hole to prevent accidental disconnection between the link 50 and the lower end of lock leg 34. Such connection also is responsible for maintaining connection between the lower end of link 50 and the outer end of the lifter arm 47. The lifter arm is prevented from moving out of engagement with the rotatable member 45 by an arcuate flange 59 interposed between the depending lugs 41.

Figure 7:
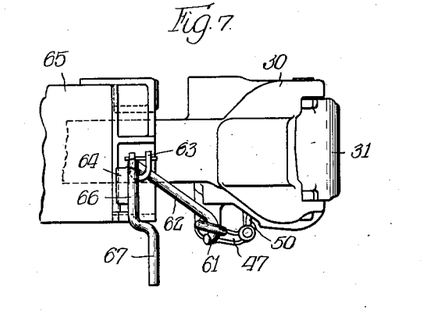
Figure 7 is a side elevation of said coupler and operating mechanism.

The rotatable member 45 is provided with an eye portion 60 which receives the hooked end 61 of an operating rod 62 whereby the rotatable member 45 is actuated for raising the lock from its lock position shown in Figure 1 to lock set position shown in Figure 2 and into full knuckle throw position shown in Figure 3. The operating rod 62 near its outer end is supported in a U shaped bearing portion 63 of a bracket 64 secured to the car end sill 65 or any other suitable portion of the car, said U shaped bearing portion permitting a longitudinal movement of the rod 62 which is necessary to accommodate the sidewise motion of the coupler. The outer end of the operating rod 62 terminates in a depending handle 66, a portion 67 of which is offset for the purpose of normally tending to prevent the counterclockwise rotation of the handle 66 as viewed in Figure 7 and accordingly normally to prevent the anti-creep portions 56 and 57 from assuming a noncooperative relationship. The operating rod 62 extends diagonally from the bracket 64 to the rotatable member 45 of the coupler and accordingly it becomes unnecessary to support the inner end of the operating rod by a bracket secured to the car frame under the coupler.

Figures 18, 19:
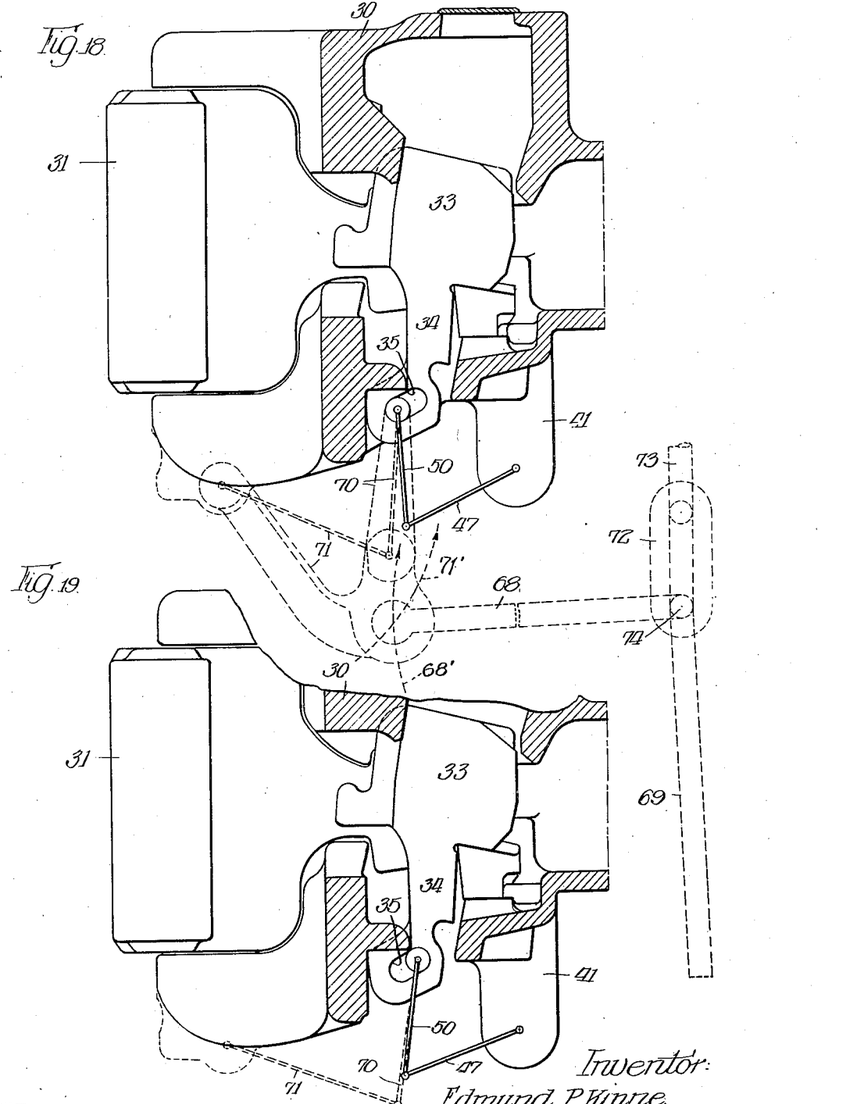
Figures 18 to 21 inclusive are fragmentary, vertical sectional views of the same coupler showing somewhat diagrammatically the coupler operating mechanism now used on the standard type D A. R. A. coupler and also the coupler operating mechanism in accordance with my invention, such diagrammatic portions being superimposed one upon the other for comparative purposes.
Figure 20:
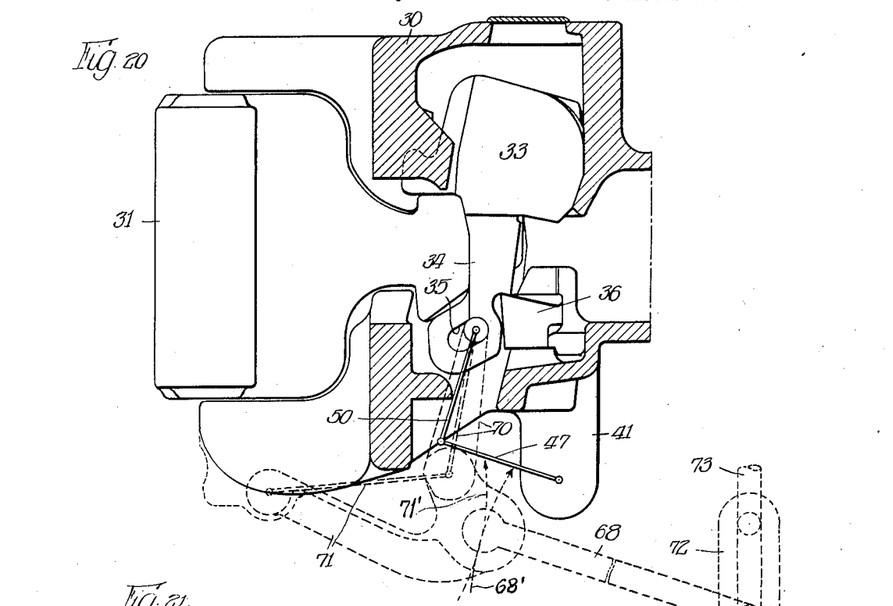
Figure 21:
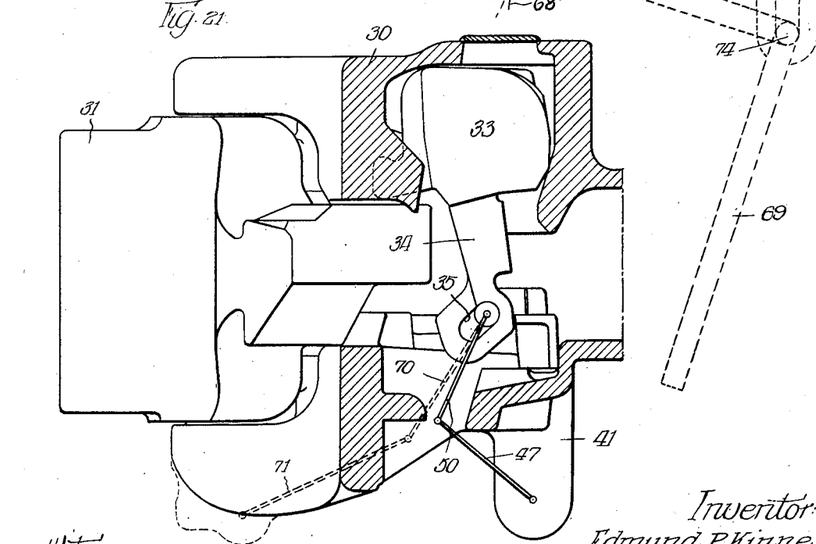

It will be noted that the handle 66 of the operating rod is of the standard length, that is to say, twelve inches, and that, referring now to Figure 20, the load arm which is the lifter arm 47 is much shorter than the corresponding load arm in the form of the link 68 on the bottom lock lifter used on the present standard A. R. A. coupler. The handle 69 of the standard A. R. A. bottom lift operating mechanism is 12 inches, the same as the one which I propose to use, but in said present standard construction the load arm 68 also is 12 inches long whereas in my arrangement the load arm or lifter arm 47 is 1/3 as long. As a result thereof, other conditions being the same, a leverage is developed in my proposed arrangement three times greater than the leverage of the standard bottom lifter now in use. To show that the other operating conditions and direction of thrust transmitted to the lock 33 is substantially the same in the two constructions, attention is directed particularly to Figures 18 to 21, inclusive. In Figure 18 in my arrangement the lifter link 50 is at an angle slightly less than a right angle with respect to the lifter arm 47 and the corresponding lifter link 70 is substantially the same with respect to its lifter arm 68, it being understood that the link 71 forms merely a guide in operative movements of the lifter arm 68. In Figure 19 the lifter links 50 and 70, which have just been moved into a position to raise the lock from locking position extend along substantially the same straight line for transmitting a thrust in that direction. In Figure 20 the lifter links 50 and 70 extend in substantially the same direction, if anything, the link 50 extending in a direction to give a greater rearward thrust to the lower end of the lock leg against the knuckle opener 36 which is desirable in moving the lock from the position shown in Figure 20 to that shown in 21, during which movement the knuckle 31 is thrust into full open position. In Figure 21 the lifter links 50 and 70 extend in directions which are generally the same, their corresponding lifter arms being substantially of the same respective angular relationships. The diagrams shown in Figures 18 to 21, inclusive, are shown primarily to illustrate that substantially the same direction of thrust for operating the lock and the coupler are maintained in the lock operating mechanism of my arrangement as in the standard type of A. R. A. coupler, and at the same time by means of my arrangement there is provided an operating leverage three times greater than there is in the standard operating arrangement. Referring to Figure 20 it will be recalled that the operating rod 74 in the standard arrangement is hung in a link 72 which in turn is hung from any suitable support 73 secured to the car frame. In my arrangement, the operating rod 62 at its inner end is connected to the rotatable operating member 45 which is mounted in the lugs 41 depending from and formed integrally with the underside of the coupler head 30 just to the rear of the bottom lock hole 40.

Dotted arcuate line 68' indicates the path of movement the outer end of arm 68 would take if the center 74 were fixed and the general direction of the force applied by said arm 68 is substantially in line with the direction of the travel of link 70. Dotted arcuate line 71' indicates the actual path of movement of the outer end of arm 68.

By means of the arrangement herein described the objects of the invention and the advantages stated are accomplished.

It is my intention to cover all modifications of the invention falling within the spirit and scope of the following claims.

I claim:

1. In coupler mechanism having a swingable knuckle and a lock for said knuckle, means for transmitting an operative movement to the coupler lock comprising a rotatable member supported by the coupler head, a lifter arm releasably connected to and disconnectable from said rotatable member by a movement at an angle to said rotatable member a link releasably connected at its upper end to said coupler lock and at its lower end to said lifter arm, and means for housing one of said latter connections for normally locking both of same against disconnection.

2. In coupler mechanism having a swingable knuckle and a coupler lock for said knuckle, means for transmitting an operative movement to the coupler lock comprising a rotatable member, a lifter arm connected to said rotatable member, a link releasably connected at one end to said coupler lock and its other end to said lifter arm, and means for housing one of said link connections for normally locking both of said link connections against disconnection.

3. In coupler mechanism having a swingable knuckle and a coupler lock for said knuckle, means for transmitting an operative movement to the coupler lock comprising a movable member, a lifter arm connected thereto, and a link releasably connecting said coupler lock and lifter arm being made solely by a relative lateral movement of said parts.

4. In coupler mechanism having a swingable knuckle and a coupler lock for said knuckle, means for transmitting an operative movement to the coupler lock comprising a movable member, a lifter arm connected thereto, and a link having an upper lateral projection releasably connected to said coupler lock and a lower lateral projection releasably connected to said lifter arm, and means for housing one of said link connections for normally locking both of said connections against disconnection.

5. In coupler mechanism having a swingable knuckle and a coupler lock for said knuckle, means for transmitting an operative movement to the coupler lock comprising a movable member, a lifter arm connected thereto, and a link having an upper lateral projection releasably connected to said coupler lock and a lower lateral projection releasably connected to said lifter arm, means for housing one of said link connections for normally locking both of said connections against disconnection, said link having a third lateral projection to cooperate with said lifter arm to insure connection of said link to said coupler lock and said lifter arm in but a single relationship.

6. In coupler mechanism having a swingable knuckle and a coupler lock for said knuckle, means for transmitting an operative movement to the coupler lock comprising a rotatable member having a key, a lifter arm having a hook portion releasably connected to said key, and a releasable link connection between said coupler lock and lifter arm.

7. In coupler mechanism having a swingable knuckle and a coupler lock for said knuckle, means for transmitting an operative movement to the coupler lock comprising a rotatable member having a projection, a lifter arm having a hook portion releasably connected to said projection, a link releasably connecting said coupler lock and lifter arm, and means for normally preventing disconnection between said link, coupler lock and lifter arm.

8. In coupler mechanism having a swingable knuckle and a coupler lock for said knuckle, means for transmitting an operative movement to the coupler lock comprising a rotatable member supported by the coupler head, a lifter arm having a portion to form a releasable connection with said rotatable member, means carried by the head for normally preventing disconnection between the rotatable member and lifter arm, and a link releasably connecting said lifter arm and coupler lock.

9. In coupler mechanism, the combination of a coupler head, a knuckle, a knuckle opener associated therewith, a lock, a supporting member associated with said coupler head, a rotatable member carried by said supporting member, a lifter arm having a hook portion normally detachably locked to and operated by said rotatable member, and a link connecting said lifter arm and lock for transmitting a lock operating movement from said rotatable member to said lock.

10. In coupler mechanism, the combination of a coupler head, a knuckle, a knuckle opener associated therewith, a lock, a supporting member associated with said coupler head, a rotatable member carried by said supporting member, a lifter arm having an open slotted portion releasably connected to and operated by said rotatable member, a link connecting said lifter arm and lock for transmitting a lock operating movement from said rotatable member to said lock, and means for normally retaining the connection between said rotatable member and lifter arm.

11. In coupler mechanism, the combination of a coupler head, a knuckle, a knuckle opener associated therewith, a lock, a supporting member associated with said coupler head, a rotatable member carried by said supporting member, a lifter arm connected to and operated by said rotatable member, a link having upper and lower lateral projections for connecting said lifter arm and lock for transmitting a lock operating movement from said rotatable member to said lock, and means for housing the upper projection to normally prevent disconnection between said link, lock and lifter arm.

12. In coupler mechanism having a swingable knuckle and a coupler lock for said knuckle, means for transmitting an operative movement to the coupler lock comprising lugs extending from the coupler head, a rotatable member trunnioned in said lugs, a lifter arm releasably connected to said rotatable member, a flange extending between said lugs for normally preventing disconnection between said lifter arm and rotatable member, and a link for releasably connecting said lifter arm and coupler lock.

13. In coupler mechanism, means for transmitting an operative movement to the lock comprising a rotatable member supported by the coupler head, a lifter arm releasably connected to and disconnectable from said rotatable member by a movement at an angle to said rotatable member, and a link connecting said lifter arm and coupler lock, the connections between said lifter arm and lock being releasable and being locked against accidental disconnection when in cooperative operating positions.

14. In coupler mechanism, lock operating means comprising a rotatable member supported by the coupler head and having a flat portion, a lifter arm having a slot for receiving the flat portion of said rotatable member and whereby said lifter arm is actuated, and a link detachably connecting said lifter arm and coupler lock for transmitting lock operating movements from said rotatable member to said lock.

15. In coupler mechanism, lock operating means comprising a rotatable member supported by the coupler head and having a flat portion, a lifter arm having a slot for receiving the flat portion of said rotatable member and whereby said lifter arm is actuated, a link detachably connecting said lifter arm and coupler lock for transmitting lock operating movements from said rotatable member to said lock, and means for preventing disconnection between said lifter arm and rotatable member when said parts are in a normal operative position.

16. In coupler mechanism, lock operating means comprising a rotatable member supported by the coupler head and having a flat portion, a lifter arm having a slot for receiving the flat portion of said rotatable member and whereby said lifter arm is actuated, a link connecting said lifter arm and coupler lock for transmitting lock operating movements from said rotatable member to said lock, means for preventing disconnection between said lifter arm and rotatable member when said parts are in a normal operative position, and means for preventing disconnection between said link and said lifter arm and lock when said parts are in a normal operative position.

17. In coupler mechanism having a swingable knuckle and a coupler lock for said knuckle, means for transmitting an operative movement to the coupler lock comprising a lug carried by the coupler head and having a bearing opening and a keyway extending from its bearing opening, a rotatable member trunnioned in said bearing opening and having a projection which may be passed through the keyway only when the rotatable member is in a given relative position and whereby the rotatable member normally is prevented from disconnection from said lug, a lifter arm having an opening for the reception of said projection on said rotatable member whereby the lifter arm may be connected to the rotatable member and actuated, and a link connecting said lifter arm and coupler lock.

Signed at Alliance, Ohio, this 21st day of Sept., 1926.

EDMUND P. KINNE.